United States Patent Office 3,476,719
Patented Nov. 4, 1969

---

3,476,719
1,3,4-THIADIAZOLE-1,3,4-OXADIAZOLE POLYMERS
August Henry Frazer and Wesley Memeger, Jr., Wilmington, Del., assignors to E. I. du Pont de Nemours and Company, Wilmington, Del., a corporation of Delaware
No Drawing. Filed Feb. 28, 1967, Ser. No. 619,163
Int. Cl. C08g 23/00, 33/04
U.S. Cl. 260—78.4
1 Claim

ABSTRACT OF THE DISCLOSURE

Thermal resistant 1,3,4-thiadiazole-hydrazide polymers prepared from the polymerization of hydrazine or a dihydrazide of an aliphatic or aromatic dicarboxylic acid and an aromatic diacid halide or ester containing a 1,3,4-thiadiazole ring; and 1,3,4-thiadiazole-1,3,4-oxadiazole polymers prepared by thermal cyclodehydration of the thiadiazole-hydrazide polymers. Films, high temperatures fibers and the like are among the end uses of these polymers.

BACKGROUND

U.S. Patent Nos. 3,130,182 and 3,130,183 describe aromatic poly(hydrazides). U.S. Patent No. 3,238,183 describes poly(1,3,4-oxadiazoles) and their preparation from poly(hydrazides). It is also known to prepare poly(1,3,4-thiadiazoles). German Patent No. 923,028 discloses 4,4′-(1,3,4-thiadiazole-2,5-diyl)-dibenzoyl chloride.

BRIEF SUMMARY OF THE INVENTION

This invention relates to a novel class of polymers that exhibit a high degree of thermal and solvent resistance and, more particularly, to high melting, intractable ordered copolymers containing 1,3,4-thiadiazole ring systems in the polymer chain.

The present invention provides novel thermally stable ordered copolymers containing an alternating sequence of 1,3,4-thiadiazole ring systems

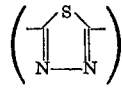

and hydrazide linkages

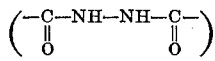

and processes for their preparation. By means of suitable thermal treatment the hydrazide groups can be converted to 1,3,4-oxadiazole ring systems

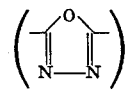

which contribute additional thermal stability to the polymers.

The ordered polymers of this invention are characterized by the following recurring structural units:

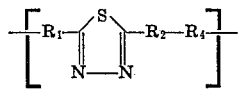

wherein $R_1$ and $R_2$ represent divalent aromatic hydrocarbon radicals. $R_4$ is selected from the group consisting of

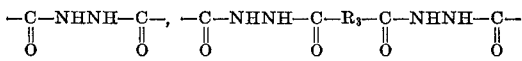

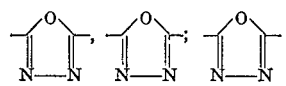

and

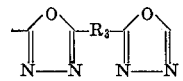

wherein $R_3$ represents a divalent hydrocarbon radical chosen from the group composed of aromatic, linear saturated aliphatic (having 1 to 6 carbon atoms inclusive) and cycloaliphatic (having 3 to 6 carbon atoms inclusive). The polymers containing the hydrazide linkages are prepared by the polymerization of hydrazine or certain dihydrazides with an aromatic diacid halide or ester containing a 1,3,4-thiadiazole ring. Polymers containing the oxadiazole linkages are prepared by thermal cyclodehydration of the polymers containing the hydrazide linkages. The polymers of this invention are highly useful in films, various high temperatures applications, and the like.

DETAILED DESCRIPTION

The ordered copoly(1,3,4-thiadiazole-hydrazides) with which the present invention is, in part, concerned are characterized by a repeating unit that is represented by one of the following general formulas:

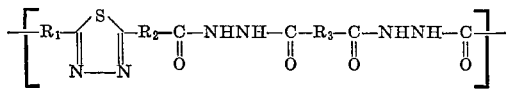

or

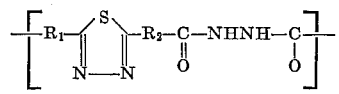

$R_1$, $R_2$ and $R_3$ are as defined hereinabove. In a preferred embodiment, $R_1$ and $R_2$ represent para-oriented phenylene radicals. $R_3$ is preferably phenylene or hexamethylene or zero. These polymers have an inherent viscosity (the measurement of which is hereinafter defined) of at least about 0.06 and preferably above 0.10.

These ordered copoly(1,3,4-thiadiazole-hydrazides) are prepared by polymerizing a mixture of hydrazine or a dihydrazide of an aliphatic or aromatic dicarboxylic acid and a substantially equimolar quantity of a suitable aromatic diacid derivative that contains a 1,3,4-thiadiazole ring system. These acid derivatives are characterized by the following general formula:

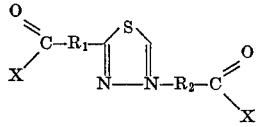

$R_1$ and $R_2$ represent divalent aromatic hydrocarbon radicals and X represents a monovalent radical chosen from the group composed of chlorine, bromine, iodine, alkoxy and aryloxy. In a preferred embodiment, $R_1$ and $R_2$ represent para-oriented phenylene radicals and X represents chlorine. This compound will hereinafter be referred to as (1,3,4-thiadiazole-2,5-diyl)-dibenzoyl chloride.

The polymerization is preferably carried out at room temperature (generally about 6 to 24 hours being sufficient) in a solvent chosen from among hexamethylphosphoramide and a 5% by weight solution of lithium chloride in N-methylpyrrolidone. The reaction mixture is stirred under an inert atmosphere to prevent any contact with atmospheric moisture, which would prematurely terminate the reaction, resulting in a product of lower molecular weight than would have been obtained in a dry environment. The concentration of monomer in the solution is preferably between 10 and 20% by weight.

Copoly(1,3,4 - thiadiazole - hydrazides) prepared from acid hydrazides other than terephthaloyl hydrazides ($R_3$=para-phenylene) are soluble in the polymerization reaction mixture. These soluble polymers are preferably spun into fibers, cast into films or formed into other shaped articles while dissolved in the polymerization reaction mixture, since no solvent other than concentrated sulfuric acid has thus far been found which will dissolve more than about 5% by weight of the isolated polymers. The low viscosity exhibited by sulfuric acid solutions of many of these polymers can be accounted for by an appreciable degree of cleavage at the hydrazide linkages. Those linkages not degraded are likely converted to 1,3,4-oxadiazole ring systems by the dehydrating action of the solvent.

Terephthaloyl hydrazide or hydrazine may be reacted with the aromatic acids or derivatives of the present invention to produce very insoluble, intractible polymers that exhibit a high thermal resistance.

When an acid halide is employed as one of the polymer-forming reactants, a suitable proton acceptor is preferably added following completion of polymerization in an amount which is sufficient to neutralize practically all of the hydrogen halide formed during the reaction. Propylene oxide has been found most suitable for this purpose, since the volatile propylene halohydrin produced can be substantially completely removed by evaporation following the subsequent shaping of the polymer.

The resistance of the present polymers to degradation at high temperatures becomes apparent when they are examined using thermogravimetric analysis, which measures weight loss as a function of temperature. The polymer prepared by reacting the preferred acid chloride (in which $R_1$ and $R_2$ of the general formulas presented above represent para-oriented phenylene radicals) with isophthaloyl hydrazide exhibits no significant weight loss from 100° to 300° C. The minor weight loss occurring below 100° C. is believed due to evaporation of surface water. Cyclodehydration of the hydrazide linkages to form 1,3,4-oxadiazole ring systems occurs between about 300 and 390° C. A relatively rapid weight loss is observed between about 450 and 580° C., at which point the polymer has lost about 63% of its original weight.

The present invention also concerns ordered copoly-(1,3,4-thiadiazole-1,3,4-oxadiazoles) which can be prepared by suitable thermal cyclodehydration of the ordered copoly(1,3,4 - thiadiazole - hydrazides) described hereinabove. The repeating units containing the 1,3,4-oxadiazole ring system are represented by one of the following structural formulas:

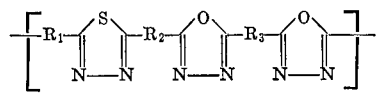

or

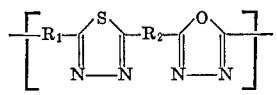

$R_1$, $R_2$, and $R_3$ are defined hereinabove. These polymers have an inherent viscosity of at least about 0.40.

The thermal conversion of the hydrazide linkages to 1,3,4-oxadiazole groups is preferably preceded by soaking the polymer in a 5% by weight aqueous solution of an aromatic sulfonic acid (preferably benzenesulfonic acid) for between 2 and 5 hours at ambient temperature and then drying the polymer in a vacuum oven at 100° C. at a pressure below 1 mm. of mercury.

The temperature and time of the cyclodehydration step is a function of the particular copoly(1,3,4-thiadiazolehydrazide) and of whether there was a sulfonic acid pretreatment. When there is no pretreatment, the temperature required to effect conversion is determined by thermogravimetric analysis as explained above. The temperature will generally range from about 164° C.–430° C. The preferred copolymer (wherein $R_1$ and $R_2$ represent para-oriented phenylene radicals and the hydrazide is isophthaloyl hydrazide) requires about 24 hours at a temperature of 305° C. to achieve substantial conversion. With a pretreatment, in which the sulfonic acid appears to catalyze the conversion, general lower temperatures and shorter times are required. In this case the preferred polymer is substantially converted in about 18 hours at 285° C.

The following examples illustrate the preparation of the novel polymers of this invention and the fibers and films formed therefrom.

The inherent viscosities in the present specification and claims are calculated as the ratio of the natural logarithm of the relative viscosity ($\eta_{rel}$) to concentration (C), where the relative viscosity is the ratio of solution viscosity to that of the pure solvent (concentrated sulfuric acid at 25° C.) and C is expressed in grams (0.5 gram) of polymer per 100 cc. of solvent. The relationship is set forth in the following equation:

$$\eta_{inh} = \ln\eta_{rel}/C$$

As described above, hydrazide linkages are generally cleaved in concentrated sulfuric acid (some apparently being converted to oxadiazole) and accordingly the viscosity readings must be taken as soon as possible after the solution is prepared.

Example I

This example illustrates the preparation of one of the preferred ordered copoly(1,3,4 - thiadiazole-hydrazides).

Methyl hydrogen terephthalate.—In a 3-liter 3-necked flask equipped with a mechanical stirrer and reflux condenser is placed 97 g. (0.5 mole) of dimethyl terephthalate (DMT) and 1500 cc. of methanol. The flask is heated on a steam bath until the DMT is completely dissolved. A solution of 56 g. (1.0 mole) of potassium hydroxide in 500 cc. of dry methanol is then added quickly. The refluxing solution remains clear for about five minutes, after which the contents of the flask are almost solidified with precipitated methyl potassium terephthalate. After refluxing for a total of 30 minutes, the flask is cooled to approximately 5° C. in an ice bath. The precipitated material is transferred on to a Büchner funnel, pressed dry, then washed by slurrying in 750 cc. of cold methanol and refiltered using a Büchner funnel. The filter cake is washed with two successive 250 cc. portions of cold methanol and, while still on the funnel, is dissolved in water precipitated as the half acid by drawing the solution through the funnel into a mixture of 2 liters of water and 100 cc. of 36% by weight hydrochloric acid. The solid methyl hydrogen terephthalate is filtered off, slurried with one liter of water to wash it free of chloride ions and dried in a 100° C. vacuum oven. The yield is 65 g. (72%), M.P. 220—222° C. (a trace of terephthalic acid is present in the melt).

4-carbmethoxy benzoyl chloride.—This material is prepared in substantially 100% yield by refluxing 65 g. of methyl hydrogen terephthalate in 500 g. of thionyl chloride for 24 hours. The resulting 4-carbmethoxy benzoyl chloride is used without further purification after removal of the excess thionyl chloride on a rotary evaporator under reduced pressure.

1,2 - di-(4-carbmethoxy benzoyl)-hydrazine.—4-Carbmethoxy benzoyl chloride (71 g.) in 250 cc. of tetrahydrofuran is added during 10 min. to 300 cc. of water containing 9 g. of hydrazine monohydrate and 30 g. of sodium bicarbonate. The precipitated hydrazide is collected by suction filtration, slurried with one liter of water, refiltered, then dried in a 100° C. vacuum oven for 24 hours. The yield is 57 g. (89%), M.P. 287—290° C. Characteristic infrared bands ($\lambda_{max}$) in Nujol appear at

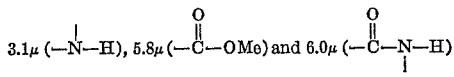

*Analysis.*—Calculated for $C_{18}H_{16}O_6$, M.W. 356: C, 60.6; H, 4.37; and N, 7.85. Found: C, 59.73, 59.73; H, 4.45, 4.42; and N, 7.85, 7.75.

2,5-di-p-carboxyphenyl —1,3,4 - thiadiazole.—1,2-di(4-carbmethoxy benzoyl)-hydrazine (57 g.) in 250 cc. of pyridine is treated with 35 g. of $P_2S_5$ at reflux for 18 hours. The mixture is cooled to about 30° C., poured into 1500 cc. of ice and water containing 250 cc. of ethanol, and neutralized with sodium bicarbonate. The precipitate is collected by suction filtration, washed several times with cold water, once with warm ethanol and filtered. The yield is 30 g. (53%), M.P. 268—270° C. The infrared band ($\lambda_{max.}^{Nujol}$)

for the ester carbonyl appears at $5.8\mu$. The characteristic ultraviolet band for the 1,3,4-thiadiazole ring system appears at 315 m$\mu$ (in ethanol). All of this product is dissolved in 1500 cc. of refluxing ethanol and combined with a solution of 11 g. of potassium hydroxide in 250 cc. of ethanol. After refluxing for one hour, the solution is combined with one liter of water and refluxed for an additional 14 hours. The solution is then cooled to approximately 50° C., filtered by gravity and the filtrate acidified using 6 N (normal) HCl until a gel-like precipitate is formed. The precipitate, collected by suction filtration and centrifuged to remove water, is transferred to a Büchner funnel and pressed dry. The resulting filter cake is washed repeatedly with cold water, then dried in a vacuum oven at 110° C. for 20 hours. The yield is 17 g. (62%)

$\lambda_{max.}^{Nujol} = 5.95\mu$ (—C—) and $\lambda_{max.}^{EtOH} = 315$ m$\mu$ (1,3,4-thiadiazole)

4,4' - (1,3,4 - thiadiazole-2,5 - diyl)-dibenzoyl chloride.—2,5-di-p-carboxy phenyl-1,3,4-thiadiazole (17 g.) is treated with 500 cc. of thionyl chloride in 200 cc. of refluxing nitrobenzene for 24 hours. After the excess thionyl chloride has been removed on a rotary evaporator under reduced pressure, the residue is recrystallized four times from nitrobenzene to yield 12 g. of pure diacid chloride

[$\lambda_{max.}^{Nujol}$ 5.6-5.75 (—C—) and $\lambda_{max.}^{hexane} = 330$ m$\mu$ (1,3,4-thiadiazole)]

*Analysis.*—Calcd. for $C_{16}H_8N_2SO_2Cl_2$, M.W. 363: Cr 52.5; H, 2.22; N, 7.71; and S, 8.83. Found: C, 53.77, 53.61; H, 2.45, 2.33; N, 7.88, 7.78; and S, 9.06, 9.76, 10.53.

Hexamethylphosphoramide (HMPA).—Crude HMPA is distilled under reduced pressure from calcium hydride (10 g./l.) through a dry Vigreux-modified Claisen head. About an 80% center cut is collected (B.P. 105° C. at 8 mm.) in an oven dried flask which is also used as the storage container.

N-methylpyrrolidone (NMP)-lithium chloride.—NMP is purified and handled in the same way as HMPA, B.P. 85° C. (15 mm.). Lithium chloride (dried in a 100° C. vacuum oven) is easily dissolved in NMP to an extent of 5% by weight by stirring at room temperature.

Preparation of copoly(p-phenylene-1,3,4-thiadiazole-p-phenylene - hydrazide - m - phenylene - hydrazide), (copolymer A) in HMPA.—To a 500 cc. resin kettle provided with an efficient three pronged stirring blade and contained in a dry box are added 3.88 g. (0.02 mole) of isophthaloyl hydrazide (M.P. 228–230° C.) and 100 cc. of HMPA. The kettle is transferred from the dry box and connected to an air motor and a dry nitrogen ($N_2$ passed over a column of potassium hydroxide and calcium hydride) line having a mercury bubbler outlet. A steady flow of nitrogen is maintained throughout the polymerization. The isophthaloyl hydrazide is dissolved by stirring vigorously and warming the flask in a water bath (at 50° C.) for about 10 min. The mixture is allowed to come to room temperature after which 7.26 g. (0.02 mole) of 4,4'-(1,3,4-triadiazole-2,5-diyl)-dibenzoyl chloride are added over a 3.5 hour period. Shortly after the final addition of the diacid chloride, the solution becomes quite viscous. The mixture is stirred for another 2 hours, after which it is allowed to stand without stirring for an additional 15 hours. The polymer is precipitated by pouring the viscous solution into a Waring Blendor containing 600 cc. of water, chopped up by means of rapid stirring and collected on a sintered glass funnel. The product is washed alternately with two 600 cc. portions of water and methanol, then finally with 600 cc. of methanol. After drying in a 110° C. vacuum oven for 24 hours, a quantitative yield of polymer is obtained. The U.V. spectrum had a maximum at 322 m$\mu$ in dimethyl sulfoxide-lithium chloride (saturated) (DMSO-LiCl) and in sulfuric acid.

*Analysis.*—Calcd. for $C_{24}H_{16}N_6O_4S$, M.W. 484; C, 59.5; H, 3.33; N, 17.4; S, 6.62 and O, 13.2. Found: C, 59.1, 59.1; H, 3.41, 3.48; N, 15.01, 15.05; S, 6.65, 6.79; and O, 15.2.

The polymer is insoluble in DMSO, partially soluble in DMSO-LiCl (sat'd.) insoluble in tetramethyl urea (TMU), partially soluble in TMU-LiCl (93.5:6.5), insoluble in dimethyl acetamide (DMAc) and partially soluble in DMAc-LiCl (sat'd.). A solution containing 0.5 g. of polymer per 100 cc. of concentrated sulfuric acid exhibited an inherent viscosity of 0.28 at 25° C. Hydrazide linkages are generally cleaved in this solvent, but apparently some are converted to oxadiazole.

Example II

Film casting of copolymer A directly from HMPA reaction mixtures.—Enough monomers are reacted in HMPA as described in Example I to yield a 10% by weight polymer solution. Films are then cast on a glass plate using a doctor blade that exhibits a clearance sufficient to produce a 0.01 inch (0.03 cm.)-thick layer of polymer solution. After heating the products in a 65° C. vacuum oven for 64 hours, followed by soaking in distilled water for 3 hours and finally drying in a 100° C. vacuum oven (p<1 mm.) for 3 hours, tough transparent films are obtained

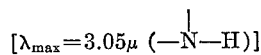
[$\lambda_{max} = 3.05\mu$ (—N—H)]

Example III

Preparation of copolymer A in n-methylpyrrolidone-lithium chloride (NMP-LiCl) (95:5).—To a 500 cc. resin kettle provided with a stirring blade contained in a dry box under nitrogen are added 6.42 g. (0.033 mole) of isophthaloyl hydrazide and 90 cc. of NMP-LiCl (95:5 by weight). The kettle is transferred from the dry box and connected to a dry nitrogen line having a mercury bubbler outlet. The isophthaloyl hydrazide dissolves quickly on warming the kettle in a 50° C. water bath with stirring. The mixture is then cooled to approximately 25° C. in a water bath which is kept in place during the addition of 12 g. (0.033 mole) of 4,4'-(1,3,4-thiadiazole-2,5-diyl)-dibenzoyl chloride over a 2.5 hour period. Vigorous stirring is maintained throughout the addition and for 0.5 hour afterwards. A slower rate of stirring is continued for an additional 17 hours. Propylene oxide (5 g., 30% excess) is then added from a dropping funnel in 1 cc. portions over 0.5 hour. Neutralization of the liberated hydrogen chloride formed during the reaction is indicated by using pHydrion paper before and after the addition of propylene oxide. The color of the mixture changes from a pale to a deep yellow upon addition of the propylene oxide. The mixture is transferred to a 250 cc. centrifuge bottle, which is then heated on a steam bath to about 100° C. Centrifugation is employed to remove bubbles from the spin dope.

Example IV

Spinning copolymer A directly from NMP-LiCl (95:5).—The copolymer A spin dope described in the previous section is dry spun at a head temperature of 85° C. and an adapted temperature of 100° C. using a spinneret having five holes, 0.0065 inch (0.017 cm.) in diameter, at a pressure of 130 p.s.i. ($9.1 \times 10^3$ g./cm.$^2$). The temperature of the spinneret is 115° C. Using a jet velocity of 18 yds./min. (16 m./min.) the fiber is wound up at a rate of 150 yds./min. (135 m./min.). Heated nitrogen ($t=245°$ C.) flows through the drying column at a rate of 5 ft.$^3$/min. (0.15 m.$^3$/min.). A room temperature water quench is used. The filaments are extracted overnight in distilled water and dried in a 100° C. vacuum oven ($p<1$ mm.) for 2 hours. Six of these five-filament bundles are plied together to form a 30 filament yarn. The yarn is then extracted with water for an additional 24 hours in a Soxhlet apparatus. Analysis indicates an ash content (LiCl) of 0.53% by weight. A sample of the individual 4.8 denier filaments exhibits a tensile strength, elongation and initial modulus of 1.04 g./denier, 71.6% and 38.0 g./denier respectively. The measurements are carried out at room temperature.

Example V

Thermal conversion of copolymer A to the corresponding copoly(1,3,4 - thiadiazole - 1,3,4 - oxadiazole).—Fiber samples are wound on small stainless steel bobbins and placed inside a thermostatted oven under a nitrogen atmosphere. A sample of converted fiber ($\eta_{inh}=0.56$ in concentrated sulfuric acid) that has been heated for 16 hours at 315° C. exhibits an ultraviolet maximum at 348 m$\mu$. An acid catalyzed hydrazide-oxadiazole conversion is performed using a film of copolymer A that is prepared as described hereinabove using an NMP-LiCl solvent system. After soaking for 4.5 hours in a 5% by weight aqueous solution of benzene-sulfonic acid, the film is dried for one hour at 100° C. in a vacuum oven under a pressure of less than 1 mm. of mercury. The film is then secured in a suitable holder and placed in an Abderhalden drying apparatus under an atmosphere of nitrogen which is heated to a temperature of 285° C. for a period of 18 hours. The infrared spectrum of the resultant film indicates substantially complete conversion of hydrazide linkages to 1,3,4-oxadiazole ring systems. The flexibility of the film is in contrast to the brittle product produced when the conversion is carried out in the absence of acid.

Example VI

Preparation of copoly(p-phenylene - 1,3,4 - thiadiazole-p-phenylene - hydrazide - tetramethylene - hydrazide).—Using a procedure similar to that described for the preparation of copolymer A, adipoyl hydrazide (0.24 g., 0.0015 mole), 4,4'-(1,3,4-thiadiazole-2,5-diyl)-dibenzoyl chloride (0.5 g., 0.0015 mole) and HMPA (5 cc.) are stirred for 18 hours in a test tube under a nitrogen atmosphere. In this instance the hydrogen chloride evolved during the reaction is not neutralized. A film is cast using a doctor blade that exhibits a clearance sufficient to produce a 0.002 inch (0.005 cm.)-thick layer of polymer solution.

After heating the resultant film in a 40° C.-vacuum oven for 6 hours, then soaking in distilled water for 6 hours, followed by a second heating in a vacuum oven for 16 hours at 120° C., a tough transparent film is obtained that exhibits a $\lambda_{max}$ of 3.1$\mu$ (—Ṅ—H)

Example VII

Preparation of copoly[p-phenylene(R$_1$)-1,3,4-thiadiazole-p-phenylene(R$_2$)-hydrazide - hydrazide] (R$_3$=O). — The polymer- and film-forming procedures of Example VI are followed using oxaloyl hydrazide (0.16 g., 0.014 mole) and 4,4'-(1,3,4 - thiadiazole - 2,5 - diyl)-dibenzoyl chloride (0.50 g., 0.14 mole), which are polymerized in 6 cc. NMP–LiCl (95:5 by weight). The resulting polymer exhibits an inherent viscosity ($\eta_{inh}$) of 1.2 and produces a transparent, flexible film. Thermogravimetric analysis of the film indicates that cyclodehydration of the hydrazide groups to form 1,3,4-oxadiazole rings occurs between 164° C. and 393° C. Decomposition of the converted polymer occurs above about 410° C.

It should be recognized that various changes and modifications may be made within the skill of the art without departing from the spirit of the invention and the scope of the appended claim.

What is claimed is:

1. A polymer consisting essentially of the following recurring structural units:

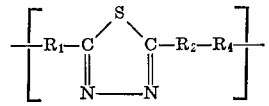

wherein R$_1$ and R$_2$ are divalent aromatic hydrocarbon radicals and R$_4$ is selected from the group consisting of:

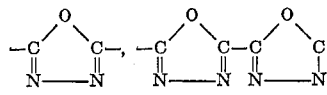

and

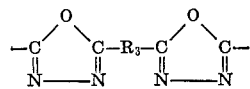

wherein R$_3$ is a divalent hydrocarbon radical selected from the group consisting of aromatic, linear saturated aliphatic having 1 to 6 carbon atoms, and cycloaliphatic having 3 to 6 carbon atoms, said polymer having an inherent viscosity of at least about 0.40 as determined in a solution of concentrated sulfuric acid at a concentration of 0.5 gram of said polymer per 100 cc. of said acid at 25° C.

References Cited

UNITED STATES PATENTS

| | | | |
|---|---|---|---|
| 3,044,994 | 7/1962 | Blomstrom | 260—78 |
| 3,130,182 | 4/1964 | Frazer | 260—78 |
| 3,130,183 | 4/1964 | Frazer | 260—78 |
| 3,238,183 | 3/1966 | Frazer | 260—78.4 |
| 3,275,608 | 9/1966 | Montgomery et al. | 260—78.4 |
| 3,324,086 | 6/1967 | Preston | 260—78 |
| 3,357,956 | 12/1967 | Frazer | 260—78 |
| 3,376,267 | 4/1968 | Pruckmayr | 260—78 |
| 3,376,268 | 4/1968 | Preston | 260—78 |
| 3,389,122 | 6/1968 | Culbertson | 260—78 |

HAROLD D. ANDERSON, Primary Examiner

U.S. Cl. X.R.

117—161; 161—172, 223; 260—30.2, 30.8, 32.6, 78, 79